US011539822B2

(12) United States Patent
Park et al.

(10) Patent No.: US 11,539,822 B2
(45) Date of Patent: Dec. 27, 2022

(54) DISPLAY ASSEMBLY AND ELECTRONIC DEVICE INCLUDING THE SAME

(71) Applicant: Samsung Electronics Co., Ltd., Suwon-si (KR)

(72) Inventors: Hyeongsoon Park, Suwon-si (KR); Jeonggyu Jo, Suwon-si (KR); Beomju Kim, Suwon-si (KR); Heeseok Jung, Suwon-si (KR); Hyunseok Kim, Suwon-si (KR); Jungsik Park, Suwon-si (KR); Sunghyup Lee, Suwon-si (KR); Hoyeong Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 16/737,013

(22) Filed: Jan. 8, 2020

(65) Prior Publication Data
US 2020/0220959 A1 Jul. 9, 2020

(30) Foreign Application Priority Data

Jan. 8, 2019 (KR) .................. 10-2019-0002155

(51) Int. Cl.
H05K 5/00 (2006.01)
H04M 1/02 (2006.01)
(Continued)

(52) U.S. Cl.
CPC ........ *H04M 1/0266* (2013.01); *G06F 1/1626* (2013.01); *G09G 3/2092* (2013.01); *G09G 2300/023* (2013.01); *H05K 5/0017* (2013.01)

(58) Field of Classification Search
CPC .... G06F 1/1626; G06F 1/1686; G06F 1/1688; G06F 1/1643; G06F 1/1628;
(Continued)

(56) References Cited

U.S. PATENT DOCUMENTS

2004/0178279 A1* 9/2004 Gundlach ........ G06K 19/07749
235/492
2010/0124945 A1* 5/2010 Hwang ................ G06F 1/1684
345/173
(Continued)

FOREIGN PATENT DOCUMENTS

KR 10-2011-0074436 A 6/2011

OTHER PUBLICATIONS

Extended European Search Report dated Mar. 30, 2020, issued in European Patent Application No. 20150681.3.
(Continued)

Primary Examiner — James Wu
Assistant Examiner — Hung Q Dang
(74) Attorney, Agent, or Firm — Jefferson IP Law, LLP

(57) ABSTRACT

An electronic device is provided. The electronic device includes a housing comprising a front plate facing a first direction, a rear plate facing a second direction opposite to the first direction, and a side member configured to enclose a space between the front plate and the rear plate, a display panel having a first surface viewed through the front plate, a cover panel coupled to a second surface of the display panel and positioned at an inner area of the display panel, the cover panel comprising a hole formed adjacent to a first edge of the display panel, and a sensor comprising a light receiving portion positioned to correspond to a position of the hole of the cover panel, and a light emitting portion positioned at an outer area of the display panel.

15 Claims, 11 Drawing Sheets

(51) Int. Cl.
*G06F 1/16* (2006.01)
*G09G 3/20* (2006.01)

(58) Field of Classification Search
CPC ... G06F 1/1656; G06F 1/1684; G09G 3/2092; G09G 2300/023; H05K 5/0017; H04M 2250/12; H04M 1/026
See application file for complete search history.

(56) References Cited

U.S. PATENT DOCUMENTS

| | | |
|---|---|---|
| 2010/0149126 A1 | 6/2010 | Futter |
| 2011/0157050 A1 | 6/2011 | Jang et al. |
| 2013/0076696 A1 | 3/2013 | Shin |
| 2013/0082980 A1 | 4/2013 | Gruhlke et al. |
| 2015/0036065 A1 | 2/2015 | Yousefpor et al. |
| 2017/0134545 A1 | 5/2017 | Lee et al. |
| 2017/0372114 A1 | 12/2017 | Cho et al. |
| 2017/0372152 A1 | 12/2017 | Baek et al. |
| 2018/0061313 A1 | 3/2018 | Jang et al. |
| 2018/0063435 A1 | 3/2018 | Cho et al. |
| 2018/0260079 A1 | 9/2018 | Zhang |
| 2018/0364869 A1 | 12/2018 | Lee et al. |

OTHER PUBLICATIONS

International Search Report dated Apr. 16, 2020, issued in International Patent Application No. PCT/KR2020/000313.

\* cited by examiner

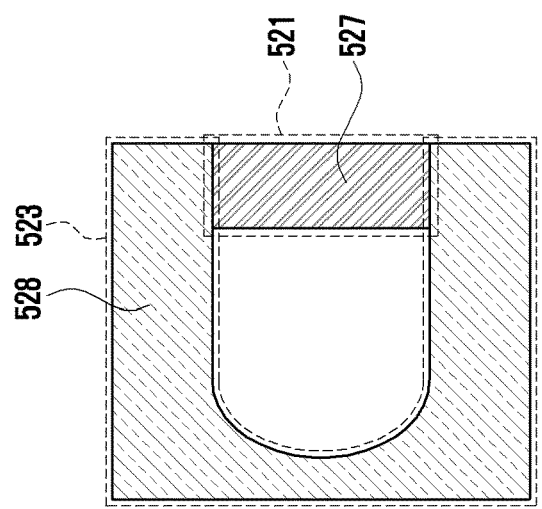
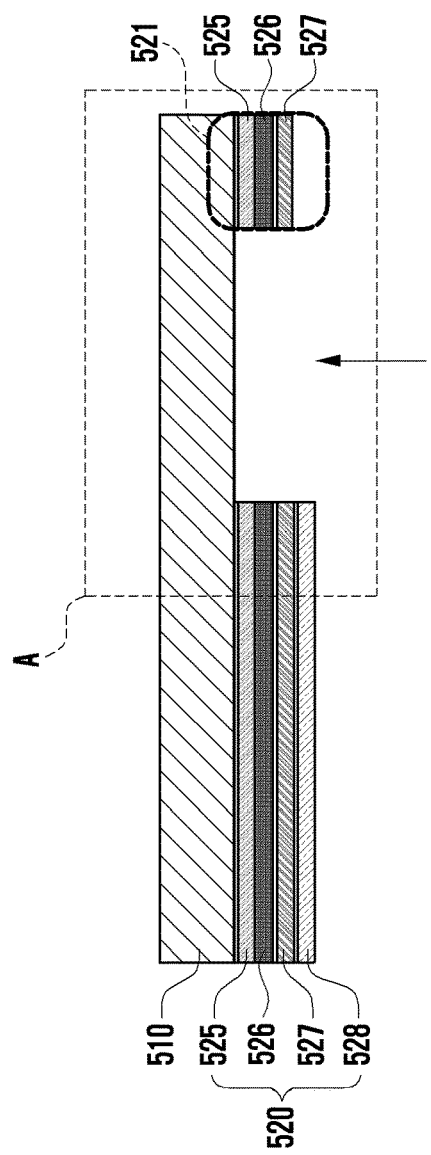
FIG. 6B
FIG. 6A

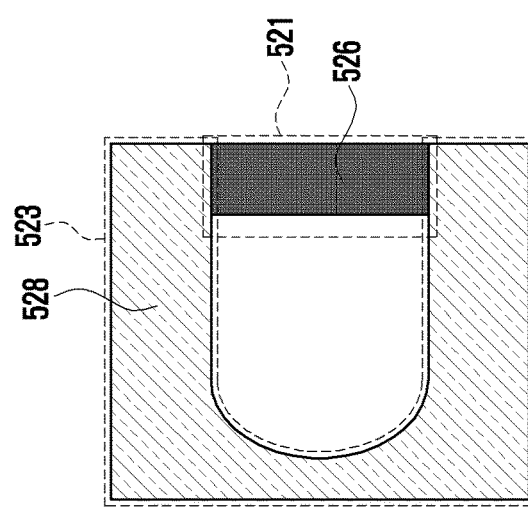
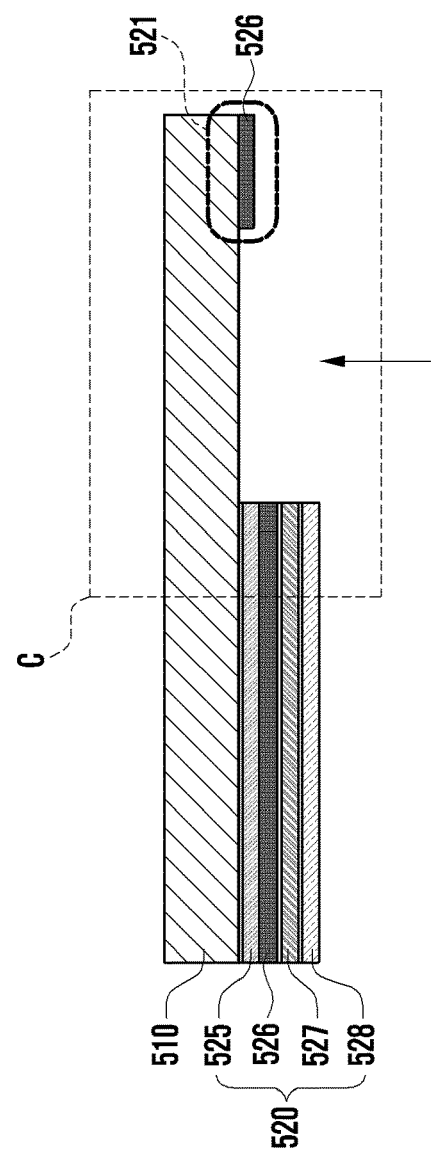
FIG. 8B
FIG. 8A

DISPLAY ASSEMBLY AND ELECTRONIC DEVICE INCLUDING THE SAME

CROSS-REFERENCE TO RELATED APPLICATION(S)

This application is based on and claims priority under 35 U.S.C. § 119(a) to Korean patent application number 10-2019-0002155, filed on Jan. 8, 2019, in the Korean Intellectual Property Office, the disclosure of which is incorporated by reference herein in its entirety.

BACKGROUND

1. Field

The disclosure relates to a display assembly and an electronic device including the same.

2. Description of the Related Art

An electronic device may include a display for providing information to a user through at least some area of a front plate. Recently produced electronic devices may have components disposed such that a display occupies substantially an entire area of a front plate in response to a user demand and convenience. Research has continued on a redisposition of various electronic components interfering when the display is disposed to occupy substantially the entire area of the front plate.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a display assembly and an electronic device including the same that can secure a light receiving performance and a light emitting performance of a sensor while minimizing any occupied space by exposing the sensor including a light receiving portion and a light emitting portion in an area (e.g., black mask (BM) area) other than an area in which a display is disposed.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a front plate facing in a first direction, a rear plate facing in a second direction opposite to the first direction, and a side member configured to enclose a space between the front plate and the rear plate, a display panel having one surface viewed through the front plate, a cover panel coupled to another surface of the display panel and positioned at an inner area of the display panel and having a hole formed adjacent to a first edge of the display panel, and a sensor including a light receiving portion positioned to correspond to a position of the hole of the cover panel and a light emitting portion positioned at an outer area of the display panel.

In accordance with another aspect of the disclosure, a display assembly is provided. The display assembly includes a front plate, a display panel having one surface viewed through the front plate, and a cover panel coupled to another surface of the display panel and having a hole formed adjacent to a first edge of the display panel. The other surface of the display panel and a light receiving portion of the sensor directly face through the hole.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 6A and 6B are diagrams illustrating a configuration of a display panel and a cover panel of an electronic device according to various embodiments of the disclosure;

FIGS. 8A and 8B are diagrams illustrating a configuration a display panel and of a cover panel of an electronic device according to various embodiments of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
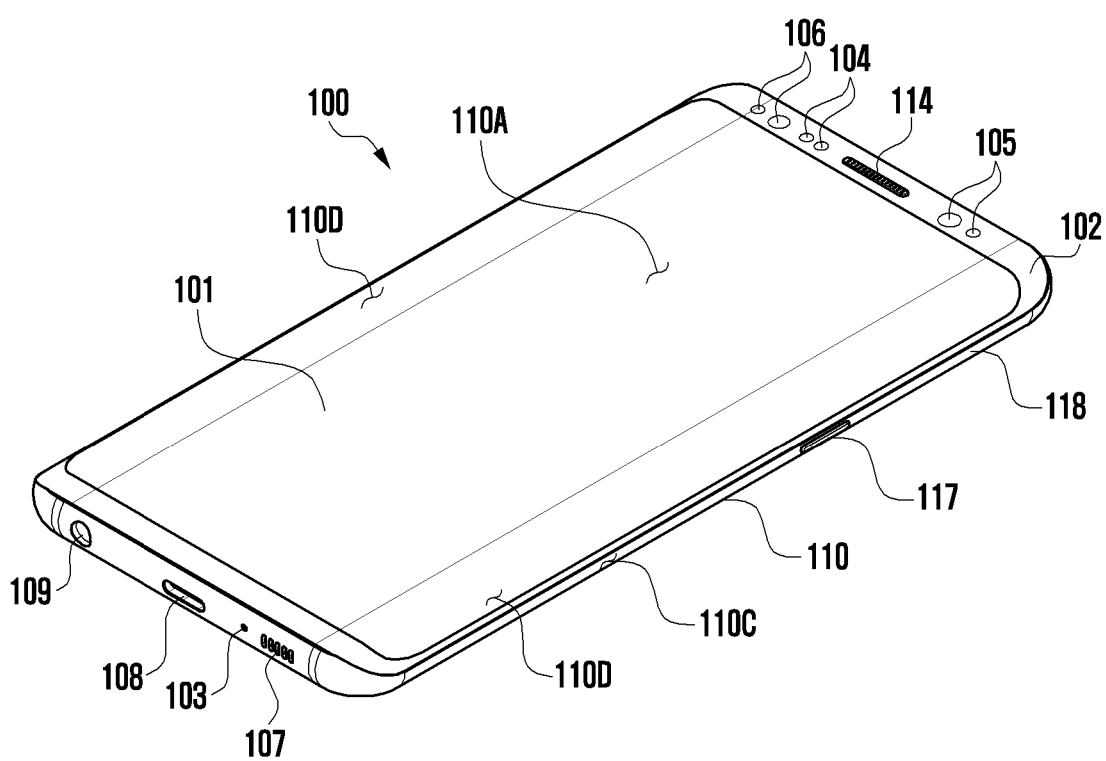
FIG. 1 is a perspective view illustrating a front surface of a mobile electronic device according to an embodiment of the disclosure.

FIG. 1 is a perspective view illustrating a front surface of a mobile electronic device according to an embodiment of the disclosure.

Figure 2:
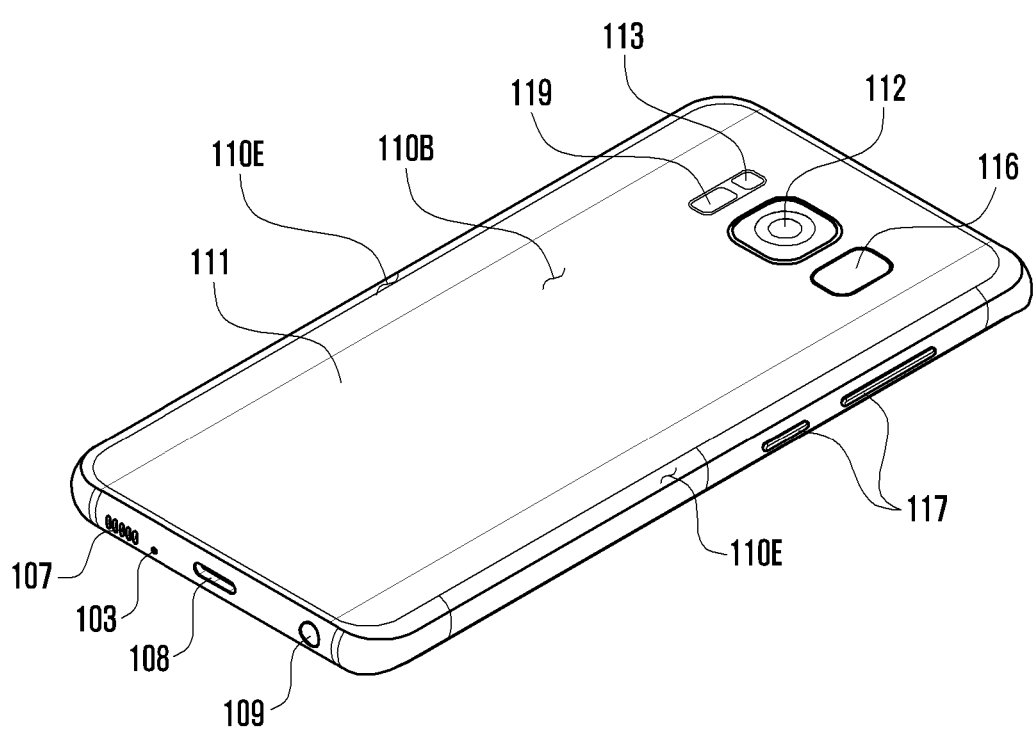
FIG. 2 is a perspective view illustrating a rear surface of the electronic device of FIG. 1 according to an embodiment of the disclosure.

FIG. 2 is a perspective view illustrating a rear surface of the electronic device of FIG. 1 according to an embodiment of the disclosure.

Referring to FIGS. 1 and 2, according to an embodiment, an electronic device 100 may include a housing 110 that includes a first surface (or front surface) 110A, a second surface (or rear surface) 110B, and a lateral surface 110C that surrounds a space between the first surface 110A and the second surface 110B. According to another embodiment, the housing 110 may refer to a structure that forms a part of the first surface 110A, the second surface 110B, and the lateral surface 110C. According to an embodiment, the first surface 110A may be formed of a front plate 102 (e.g., a glass plate or polymer plate coated with a variety of coating layers) at least a part of which is substantially transparent. The second surface 110B may be formed of a rear plate 111 which is substantially opaque. The rear plate 111 may be formed of, for example, coated or colored glass, ceramic, polymer, metal (e.g., aluminum, stainless steel (STS), or magnesium), or any combination thereof. The lateral surface 110C may be formed of a lateral bezel structure (or "lateral member") 118 which is combined with the front plate 102 and the rear plate 111 and includes a metal and/or polymer. The rear plate 111 and the lateral bezel structure 118 may be integrally formed and may be of the same material (e.g., a metallic material such as aluminum).

In the shown embodiment, the front plate 102 may include two first regions 110D disposed at long edges thereof, respectively, and bent and extended seamlessly from the first surface 110A toward the rear plate 111. In the shown embodiment, the rear plate 111 may include two second regions 110E disposed at long edges thereof, respectively, and bent and extended seamlessly from the second surface 110B toward the front plate 102 (refer to FIG. 2). In various embodiments, the front plate 102 (or the rear plate 111) may include only one of the first regions 110D (or of the second regions 110E). In various embodiments, the first regions 110D or the second regions 110E may be omitted in part. In the embodiments, when viewed from a lateral side of the electronic device 100, the lateral bezel structure 118 may have a first thickness (or width) on a lateral side where one of the first regions 110D or one of the second regions 110E is not included, and may have a second thickness, being less than the first thickness, on another lateral side where one of the first regions 110D or one of the second regions 110E is included.

According to an embodiment, the electronic device 100 may include at least one of a display 101, audio modules 103, 107 and 114, sensor modules 104, 116 and 119, camera modules 105, 112 and 113, key input devices 117, a light emitting device 106, and connector holes 108 and 109. In various embodiments, the electronic device 100 may omit at least one (e.g., the key input devices 117 or the light emitting device 106) of the above components, or may further include other components.

The display 101 may be exposed through a substantial portion of the front plate 102, for example. In various embodiments, at least a part of the display 101 may be exposed through the front plate 102 that forms the first surface 110A and the first regions 110D. In various embodiments, outlines (i.e., edges and corners) of the display 101 may have substantially the same form as those of the front plate 102. In another embodiment (not shown), the spacing between the outline of the display 101 and the outline of the front plate 102 may be substantially unchanged in order to enlarge the exposed area of the display 101.

In another embodiment (not shown), a recess or opening may be formed in a portion of a display area of the display 101 to accommodate at least one of the audio modules (e.g., the audio module 114), the sensor module 104, the camera module 105, and the light emitting device 106. In another embodiment (not shown), at least one of the audio modules (e.g., the audio module 114), the sensor module 104, the camera module 105, the sensor module 116 (e.g., a fingerprint sensor), and the light emitting device 106 may be disposed on the back of the display area of the display 101. In another embodiment (not shown), the display 101 may be combined with, or adjacent to, a touch sensing circuit, a pressure sensor capable of measuring the touch strength (pressure), and/or a digitizer for detecting a stylus pen. In various embodiments, at least a part of the sensor modules 104 and 119 and/or at least a part of the key input devices 117 may be disposed in one of the first regions 110D and/or one of the second regions 110E.

The audio modules 103, 107 and 114 may correspond to a microphone hole (e.g., the audio module 103) and speaker holes (e.g., the audio modules 107 and 114). The microphone hole may contain a microphone disposed therein for acquiring external sounds and, in a case, contain a plurality of microphones to sense a sound direction. The speaker holes may be classified into an external speaker hole and a call receiver hole. In various embodiments, the microphone hole and the speaker holes may be implemented as a single hole, or a speaker (e.g., a piezo speaker) may be provided without the speaker holes.

The sensor modules 104, 116 and 119 may generate electrical signals or data corresponding to an internal operating state of the electronic device 100 or to an external environmental condition. The sensor modules 104, 116 and 119 may include a first sensor module (e.g., the sensor module 104) (e.g., a proximity sensor) and/or a second sensor module (e.g., a fingerprint sensor) disposed on the first surface 110A of the housing 110, and/or a third sensor module (e.g., the sensor module 119) (e.g., a heart rate monitor (HRM) sensor) and/or a fourth sensor module (e.g., the sensor module 116) (e.g., a fingerprint sensor) disposed on the second surface 110B of the housing 110. The fingerprint sensor may be disposed on the second surface 110B as well as the first surface 110A (e.g., the display 101) of the housing 110. The electronic device 100 may further include at least one of a gesture sensor, a gyro sensor, an air pressure sensor, a magnetic sensor, an acceleration sensor, a grip sensor, a color sensor, an infrared (IR) sensor, a biometric sensor, a temperature sensor, a humidity sensor, or an illuminance sensor.

The camera modules 105, 112 and 113 may include a first camera device (e.g., the camera module 105) disposed on the first surface 110A of the electronic device 100, and a second camera device (e.g., the camera module 112) and/or a flash (e.g., the camera module 113) disposed on the second surface 110B. The camera module 105 or the camera module 112 may include one or more lenses, an image sensor, and/or an image signal processor. The flash may include, for example, a light emitting diode or a xenon lamp. In various embodiments, two or more lenses (infrared cameras, wide angle and telephoto lenses) and image sensors may be disposed on one side of the electronic device 100.

The key input devices 117 may be disposed on the lateral surface 110C of the housing 110. In another embodiment, the electronic device 100 may not include some or all of the key input devices 117 described above, and the key input devices 117 which are not included may be implemented in another form such as a soft key on the display 101. In various embodiments, the key input devices 117 may include the sensor module 116 disposed on the second surface 110B of the housing 110.

The light emitting device 106 may be disposed on the first surface 110A of the housing 110, for example. For example, the light emitting device 106 may provide status information of the electronic device 100 in an optical form. In various embodiments, the light emitting device 106 may provide a light source associated with the operation of the camera module 105. The light emitting device 106 may include, for example, a light emitting diode (LED), an infrared (IR) LED, or a xenon lamp.

The connector holes 108 and 109 may include a first connector hole (e.g., the connector hole 108) adapted for a connector (e.g., a universal serial bus (USB) connector) for transmitting and receiving power and/or data to and from an external electronic device, and/or a second connector hole (e.g., the connector hole 109) adapted for a connector (e.g., an earphone jack) for transmitting and receiving an audio signal to and from an external electronic device.

Figure 3:
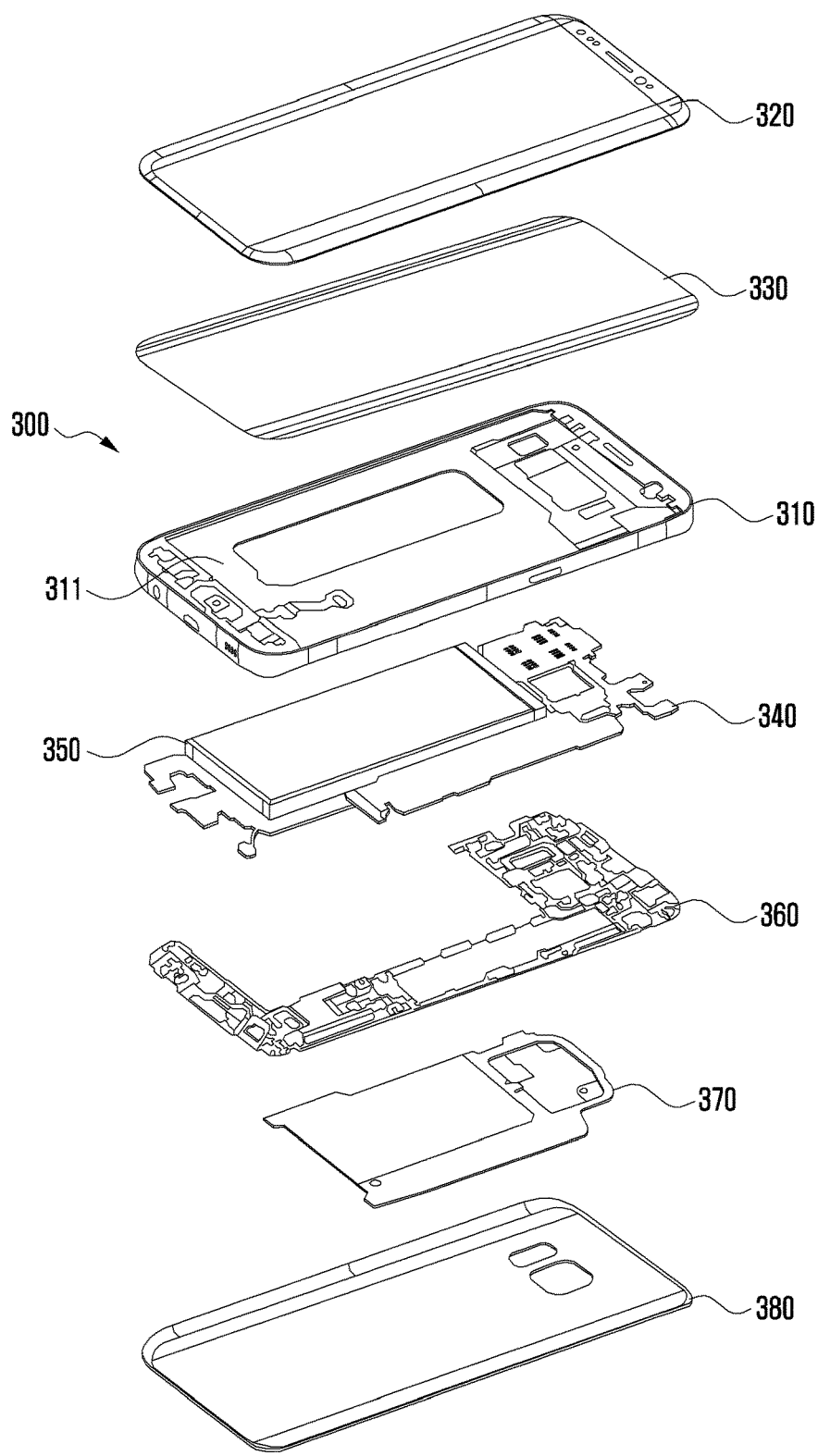
FIG. 3 is an exploded perspective view illustrating the electronic device of FIG. 1 according to an embodiment of the disclosure.

FIG. 3 is an exploded perspective view illustrating the electronic device of FIG. 1 according to an embodiment of the disclosure.

Referring to FIG. 3, an electronic device 300 (e.g., the electronic device 100 of FIG. 1) may include a lateral bezel structure 310, a first support member 311 (e.g., a bracket), a front plate 320, a display 330 (e.g., the display 101), a printed circuit board (PCB) 340, a battery 350, a second support member 360 (e.g., a rear case), an antenna 370, and a rear plate 380. In various embodiments, the electronic device 300 may omit at least one (e.g., the first support member 311 or the second support member 360) of the above components or may further include another component. Some components of the electronic device 300 may be the same as or similar to those of the electronic device 100 shown in FIG. 1 or FIG. 2, thus, descriptions thereof are omitted below.

The first support member 311 is disposed inside the electronic device 300 and may be connected to, or integrated with, the lateral bezel structure 310. The first support member 311 may be formed of, for example, a metallic material and/or a non-metal (e.g., polymer) material. The first support member 311 may be combined with the display 330 at one side thereof and also combined with the PCB 340 at the other side thereof. On the PCB 340, a processor, a memory, and/or an interface may be mounted. The processor may include, for example, one or more of a central processing unit (CPU), an application processor (AP), a graphics processing unit (GPU), an image signal processor (ISP), a sensor hub processor, or a communications processor (CP).

The memory may include, for example, volatile memory or non-volatile memory.

The interface may include, for example, a high definition multimedia interface (HDMI), a USB interface, a secure digital (SD) card interface, and/or an audio interface. The interface may electrically or physically connect the electronic device 300 with an external electronic device and may include a USB connector, an SD card/multimedia card (MMC) connector, or an audio connector.

The battery 350 is a device for supplying power to at least one component of the electronic device 300, and may include, for example, a non-rechargeable primary battery, a rechargeable secondary battery, or a fuel cell. At least a part of the battery 350 may be disposed on substantially the same plane as the PCB 340. The battery 350 may be integrally disposed within the electronic device 300, and may be detachably disposed from the electronic device 300.

The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may perform short-range communication with an external device, or transmit and receive power required for charging wirelessly. An antenna structure may be formed by a part or combination of the lateral bezel structure 310 and/or the first support member 311.

Figure 4:
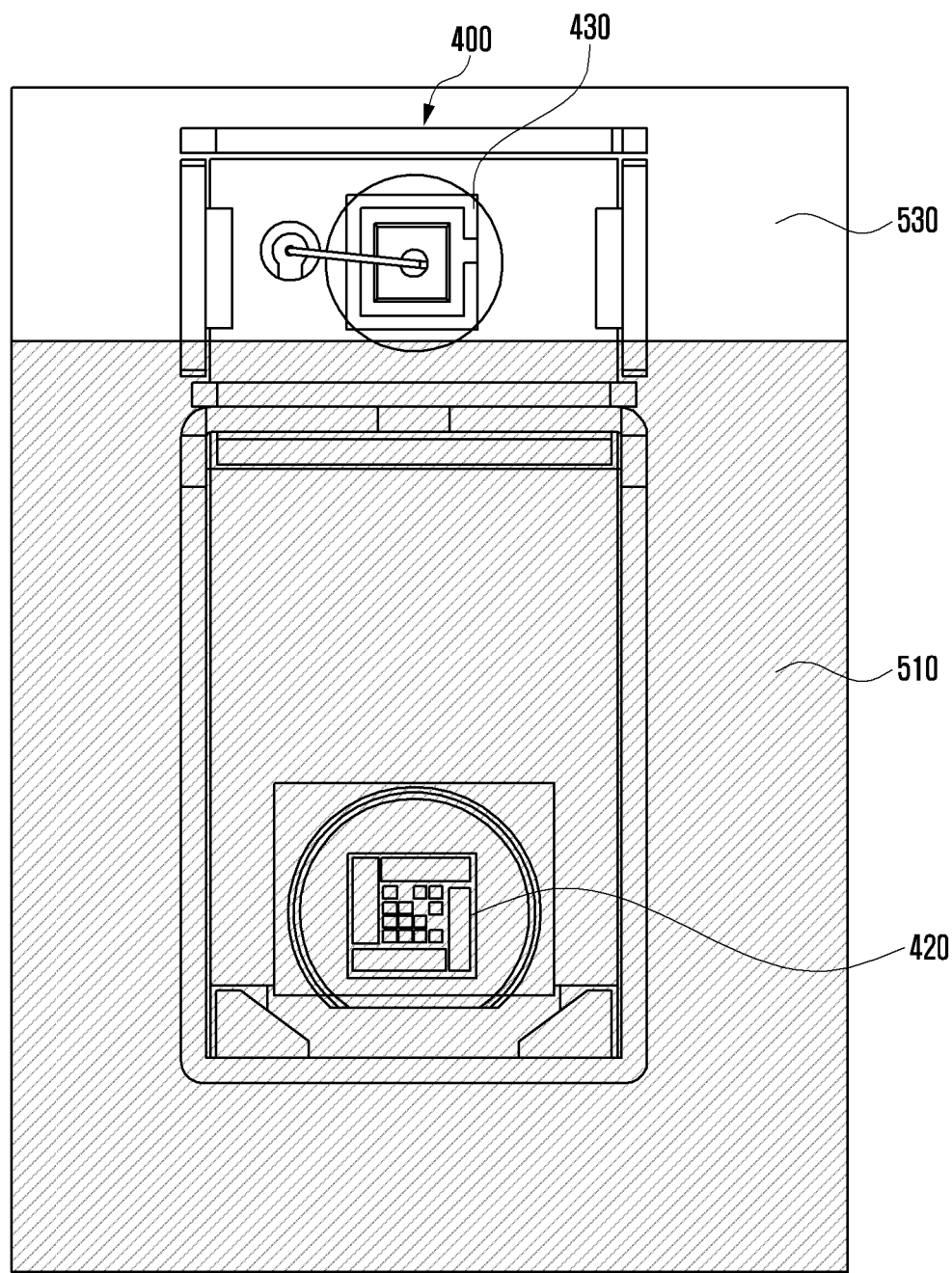
FIG. 4 is a diagram illustrating a form in which a sensor of an electronic device is disposed according to an embodiment of the disclosure.

FIG. 4 is a diagram illustrating a form in which a sensor of an electronic device is disposed according to an embodiment of the disclosure.

Referring to FIG. 4, the electronic device according to an embodiment of the disclosure may include an active area where a display panel 510 is positioned and a black mask (BM) area 530, except for the active area. The active area is an area for displaying information by emitting light from the display panel 510 and may correspond to the display panel 510. The BM area 530 may be a space for disposing a portion of a component such as a sensor 400 or a space for mounting, for example, the front plate 102 (see FIG. 1) of the electronic device to couple to the first support member 311 (see FIG. 3).

The sensor 400 of the electronic device according to an embodiment of the disclosure may include a light receiving portion 420 and a light emitting portion 430. The sensor 400 may be, for example, the sensor 400 including the light receiving portion 420 and the light emitting portion 430 such as a proximity illuminance sensor or a time of flight (TOF) sensor. The light receiving portion 420 may be disposed at a rear surface of the display panel 510, and the light emitting portion 430 may be disposed not to overlap with the display panel 510. By positioning the light receiving portion 420, which is a portion of the sensor 400, at a rear surface of the display panel 510 and exposing only the light emitting portion 430 at the BM area 530, the BM area 530 of the electronic device can be minimized.

Figure 5:
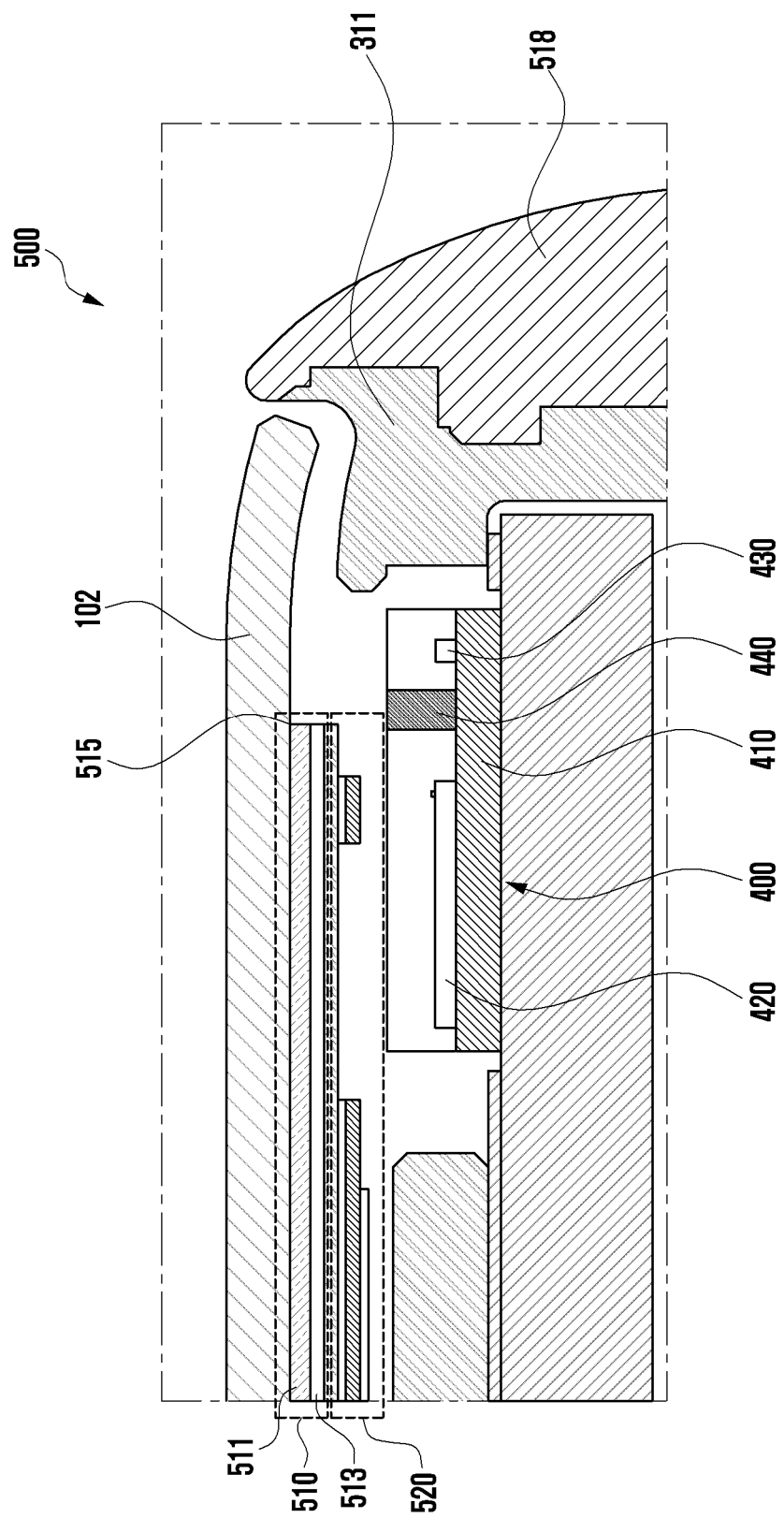
FIG. 5 is a cross-sectional view illustrating a portion in which a sensor of an electronic device is disposed according to an embodiment of the disclosure.

FIG. 5 is a cross-sectional view illustrating a portion in which a sensor of an electronic device is disposed according to an embodiment of the disclosure.

Referring to FIG. 5, an electronic device 500 (e.g., the electronic device 100 of FIG. 1) according to an embodiment of the disclosure may include the front plate 102, a rear plate, side member 518, the display panel 510, a cover panel 520, and the sensor 400.

The front plate 102 according to an embodiment of the disclosure may be disposed to face a first direction and correspond to a window of the electronic device 500. The first direction is a direction in which the window of the electronic device 500 faces and may correspond to an upward direction based on an illustrated state of FIG. 5.

The rear plate 111 (see FIG. 2) according to an embodiment of the disclosure may be the same as the rear plate illustrated in FIG. 3 and correspond to a rear cover or rear glass of the electronic device 500 when being disposed to face a second direction. The second direction is a direction opposite to the first direction and may correspond to a downward direction based on the illustrated state of FIG. 5.

A side member according to an embodiment of the disclosure is formed to enclose a space between the front plate 102 and the rear plate 111 and may be a side bezel. The side member 518 may be formed integrally with or separately from the first support member 311 (see FIG. 3) for mounting the display panel 510.

The display panel 510 according to an embodiment of the disclosure may include a touch sensor disposed at a rear surface of the front plate 102 for detecting a touch signal input through the front plate 102, a display 513 for receiving power to emit light under the control of a display driver integrated circuit (IC), and a polarizing plate 511 for preventing light generated in the display 513 from being diffusely reflected or being diffused in an unintended direction. For example, the rear surface is a surface facing the second direction, and a rear surface of the front plate 102 may mean a lower surface based on the illustrated state of FIG. 5. FIG. 5 illustrates that the polarizing plate 511 is disposed at the rear surface of the front plate 102 and that the display 513 is disposed at the rear surface of the polarizing plate 511, but the disclosure is not limited thereto and components including a touch sensor may be additionally disposed.

The cover panel 520 according to an embodiment of the disclosure may be disposed at a rear surface of the display panel 510 and may collectively indicate a layer for performing various functions including electromagnetic signal shielding and protection of the display panel 510 at the rear surface of the display panel 510.

The sensor 400 according to an embodiment of the disclosure may include a circuit board 410, the light receiving portion 420, the light emitting portion 430, and a first partition wall 440. The light receiving portion 420 and the light emitting portion 430 may be mounted and operated in the circuit board 410, and the first partition wall 440 may be formed between the light receiving portion 420 and the light emitting portion 430. The first partition wall 440 may prevent light generated in the light emitting portion 430 from entering directly into the light receiving portion 420. The sensor 400 according to an embodiment of the disclosure may be, for example, a proximity illuminance sensor or a TOF sensor. The light emitting portion 430 may be disposed in an area that does not overlap with the display panel 510, and the light receiving portion 420 may be disposed at a rear surface so as to overlap with the display panel 510. The light receiving portion 420 may be disposed to correspond to a position of a hole of the cover panel 520. As the light receiving portion 420 is positioned at a rear surface of the display panel 510, in order to minimize a light receiving performance from deteriorating, the light receiving portion 420 is positioned at a position of a hole formed by partially removing the cover panel 520 to minimize a light receiving performance from deteriorating.

FIGS. 6A and 6B are diagrams illustrating a configuration of a display panel and a cover panel of an electronic device according to various embodiments of the disclosure. FIG. 6A is a diagram illustrating a cut-away cross-section based on a position of a hole in a cover panel, and FIG. 6B is a diagram viewed toward a first direction (e.g., an arrow direction of FIG. 6A) at a rear surface of a cover panel.

The cover panel 520 according to an embodiment of the disclosure may include a first area 521 and a second area 523. The first area 521 may correspond to an area extended in a direction of a first edge 515 from a hole of the cover panel 520, and the second area 523 may mean portions, except for the first area 521 and the hole.

Referring to FIG. 6A, the cover panel 520 according to an embodiment of the disclosure may include an embossed layer 525, a light shielding layer 526, a cushion layer 527, and an electromagnetic shielding layer 528. The embossed layer 525 may be disposed at a rear surface of the display panel 510, absorb an impact applied to the display panel 510, and receive an uneven shape that may be formed at a rear surface of the display panel 510. The light shielding layer 526 may be disposed at a rear surface of the embossed layer 525 and may block transmission of light generated in the display panel 510, light generated inside the electronic device 500, or light by diffused reflection. The cushion layer 527 may be disposed at a rear surface of the light shielding layer 526 to absorb an impact applied to the display panel 510. The electromagnetic shielding layer 528 may be disposed at a rear surface of the cushion layer 527 and may block signals generated according to an operation of various components disposed inside the electronic device 500 or the display panel 510 so as not to influence each other. For example, the electromagnetic shielding layer may be made of a metal such as copper (Cu). The cover panel 520 may have a hole formed adjacent to the first edge 515 of the display panel 510. For example, the first edge 515 (see FIG. 5) may correspond to an edge of the right end based on an illustrated state of FIG. 5 and may correspond to an edge of the upper end when the electronic device 500 is viewed.

Referring to FIG. 6B, a hole of the cover panel 520 may be processed in a form of drilling a hole in the cover panel 520 or may be formed with a method of redisposing the cover panel 520 in the first area 521 after the hole and the first area 521 are collectively removed. In a description of the disclosure, a case will be illustrated in which a hole is formed with a method of redisposing the cover panel 520 in the first area 521 after the hole and the first area 521 are collectively removed.

Referring to FIGS. 6A and 6B, the second area 523 of the cover panel 520 may sequentially include the embossed layer 525, the light shielding layer 526, the cushion layer 527, and the electromagnetic shielding layer 528, and the first area 521 of the cover panel 520 may sequentially include the embossed layer 525, the light shielding layer 526, and the cushion layer 527. The first area 521 is positioned between the light receiving portion 420 and the light emitting portion 430 of the sensor 400 and, when the electromagnetic shielding layer 528 is disposed in the first area 521, signal crosstalk may occur between the light receiving portion 420 and the light emitting portion 430 of the sensor 400; therefore, the electromagnetic shielding layer 528 of the first area 521 may be removed.

Figure 7B:
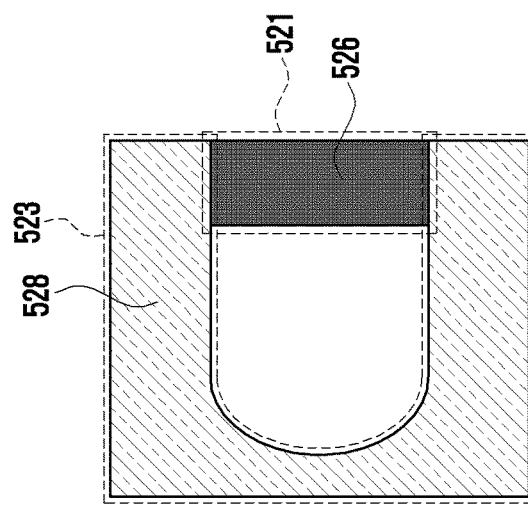
FIGS. 7A and 7B are diagrams illustrating a configuration of a display panel and a cover panel of an electronic device according to various embodiments of the disclosure.
Figure 7A:
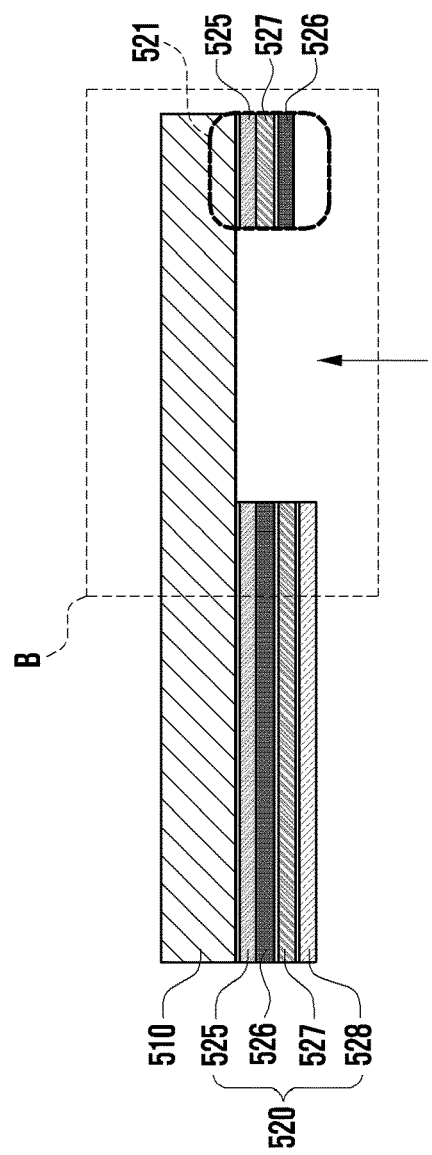

FIGS. 7A and 7B are diagrams illustrating a configuration of a display panel and a cover panel of an electronic device according to another embodiment of the disclosure. FIG. 7A is a diagram illustrating a cut-away cross-section based on a position of a hole in a cover panel, and FIG. 7B a diagram viewed toward a first direction (e.g., an arrow direction of FIG. 7A) at a rear surface of a cover panel.

Referring to FIGS. 7A and 7B, the second area 523 of the cover panel 520 may sequentially include the embossed layer 525, the light shielding layer 526, the cushion layer 527, and the electromagnetic shielding layer 528, and the first area 521 may sequentially include the embossed layer 525, the cushion layer 527, and the light shielding layer 526.

According to an embodiment of the disclosure, the first area 521 is positioned between the light receiving portion 420 and the light emitting portion 430 of the sensor 400 and, when the electromagnetic shielding layer 528 is disposed in the first area 521, signal crosstalk may occur between the light receiving portion 420 and the light emitting portion 430 of the sensor 400, and therefore the electromagnetic shielding layer 528 of the first area 521 may be removed. By replacing the stacking order of the light shielding layer 526 and the cushion layer 527 of the first area 521, while a light shielding performance is improved, signal crosstalk between the light receiving portion 420 and the light emitting portion 430 of the sensor 400 may be further reduced.

FIGS. 8A and 8B are diagrams illustrating a configuration of a display panel and a cover panel of an electronic device according to various embodiments of the disclosure. FIG. 8A is a diagram illustrating a cut-away cross-section based on a position of a hole of a cover panel, and FIG. 8B is a diagram viewed in a first direction (e.g., an arrow direction of FIG. 8A) at a rear surface of a cover panel.

Referring to FIGS. 8A and 8B, the second area 523 of the cover panel 520 may sequentially include the embossed layer 525, the light shielding layer 526, the cushion layer 527, and the electromagnetic shielding layer 528, and the first area 521 of the cover panel 520 may include the light shielding layer 526.

According to another embodiment of the disclosure, the first area 521 is positioned between the light receiving portion 420 and the light emitting portion 430 of the sensor 400 and, when the electromagnetic shielding layer 528 is disposed in the first area 521, signal crosstalk may occur between the light receiving portion 420 and the light emitting portion 430 of the sensor 400, and therefore the electromagnetic shielding layer 528 of the first area 521 may be removed. By simplifying a process of post-processing by disposing only the light shielding layer 526 at a rear surface of the display panel 510 in the first area 521 of the cover panel 520, a production speed can be improved and a cost can be reduced.

Figure 9:
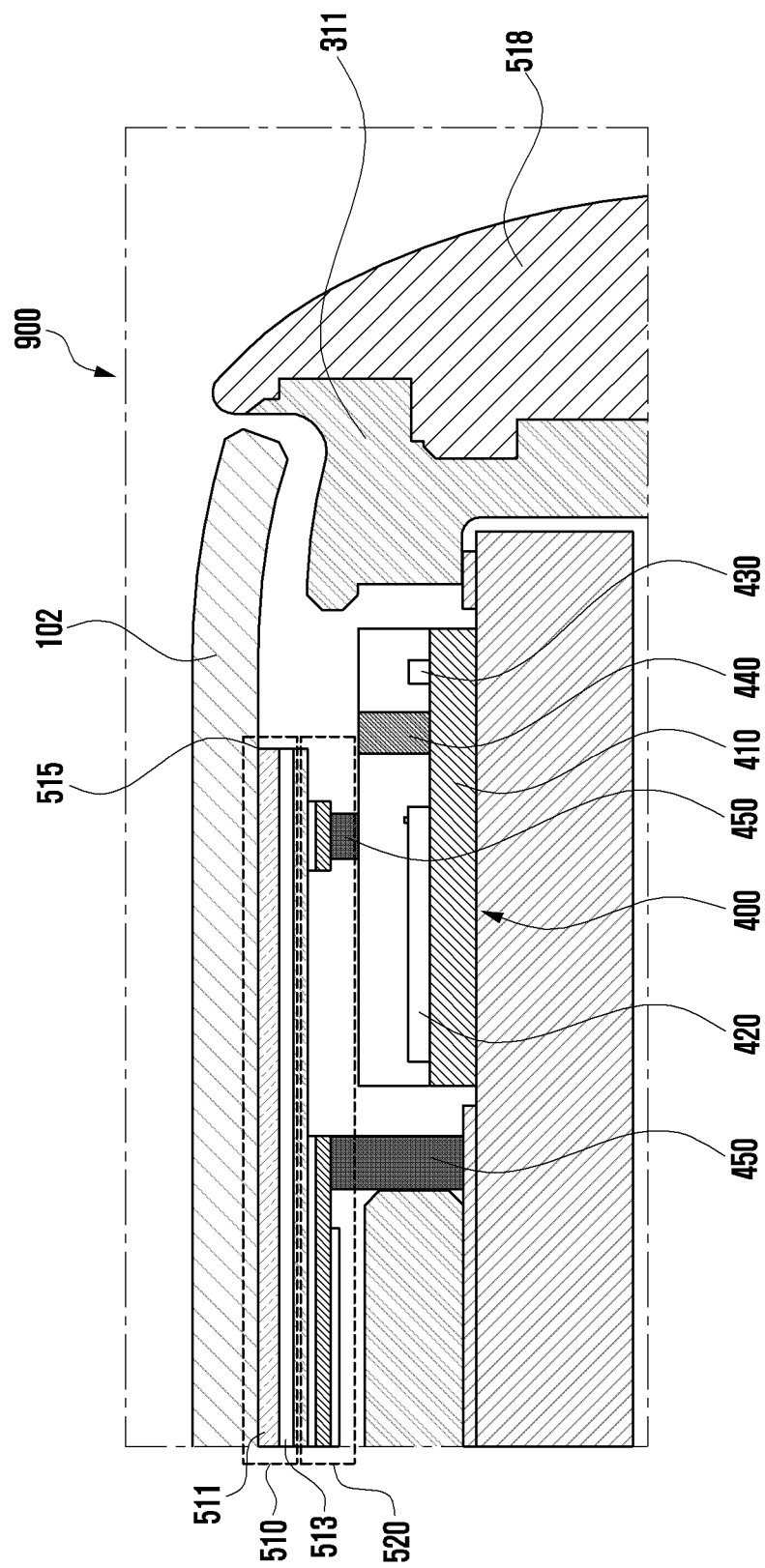
FIG. 9 is a diagram illustrating a second partition wall formed in a cover panel of an electronic device according to an embodiment of the disclosure.

FIG. 9 is a diagram illustrating a second partition wall formed in a cover panel of an electronic device according to an embodiment of the disclosure.

Referring to FIG. 9, according to various embodiments of the disclosure, it may be advantageous for an accurate operation of the sensor 400 that the light receiving portion 420 of the sensor 400 blocks light that may be recognized as a noise signal other than light that passes through the front plate 102 and the display panel 510. For example, by forming a second partition wall 450 about a hole of the cover panel 520 corresponding to a position of the light receiving portion 420 of the sensor 400, light other than light entering through the front plate 102 and the display panel 510 may be blocked. The second partition wall 450 may be protruded from a rear surface of the cover panel 520.

Figure 10:
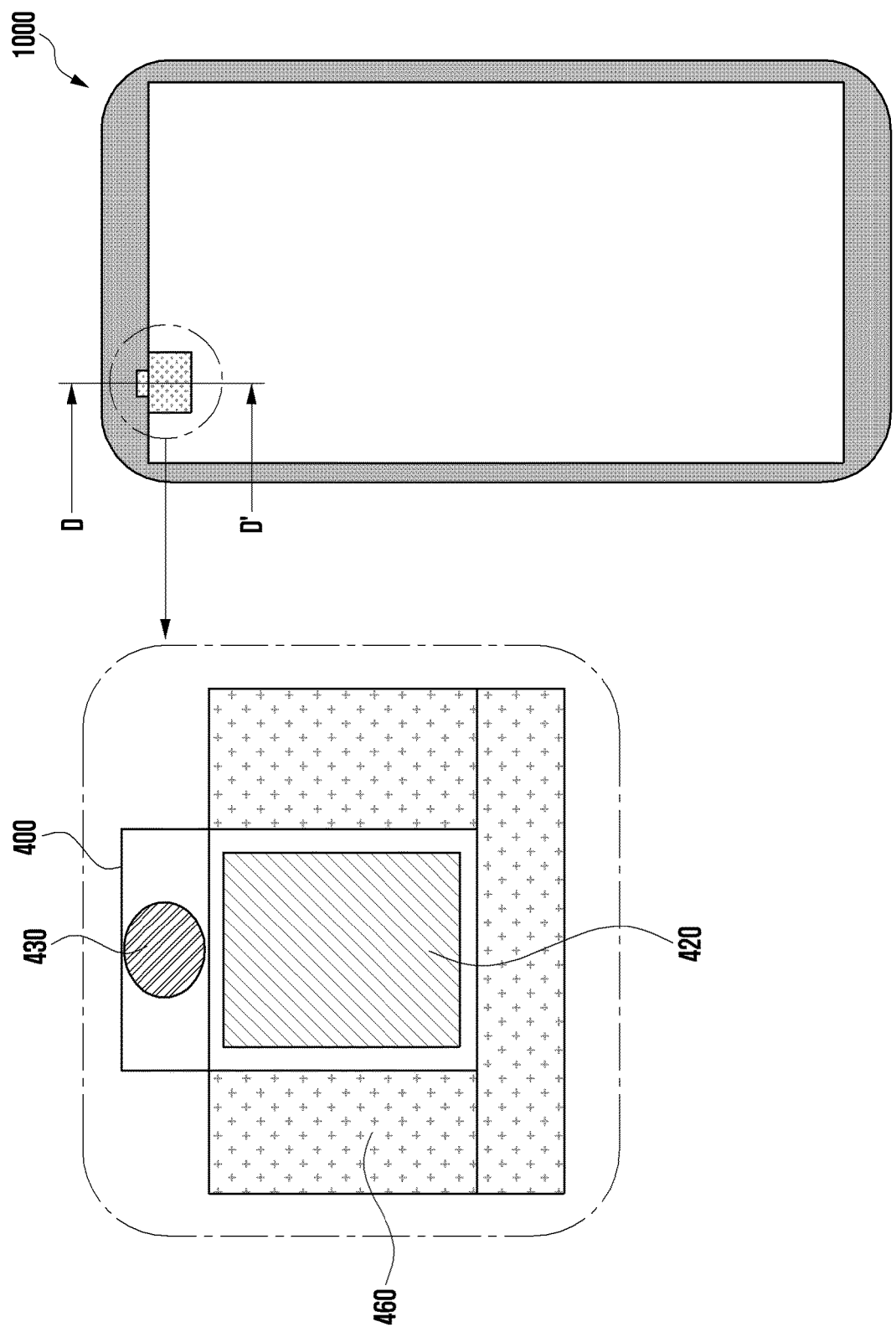
FIGS. 10 and 11 are diagrams illustrating a portion in which a sensor of an electronic device is disposed according to various embodiments of the disclosure.
Figure 11:
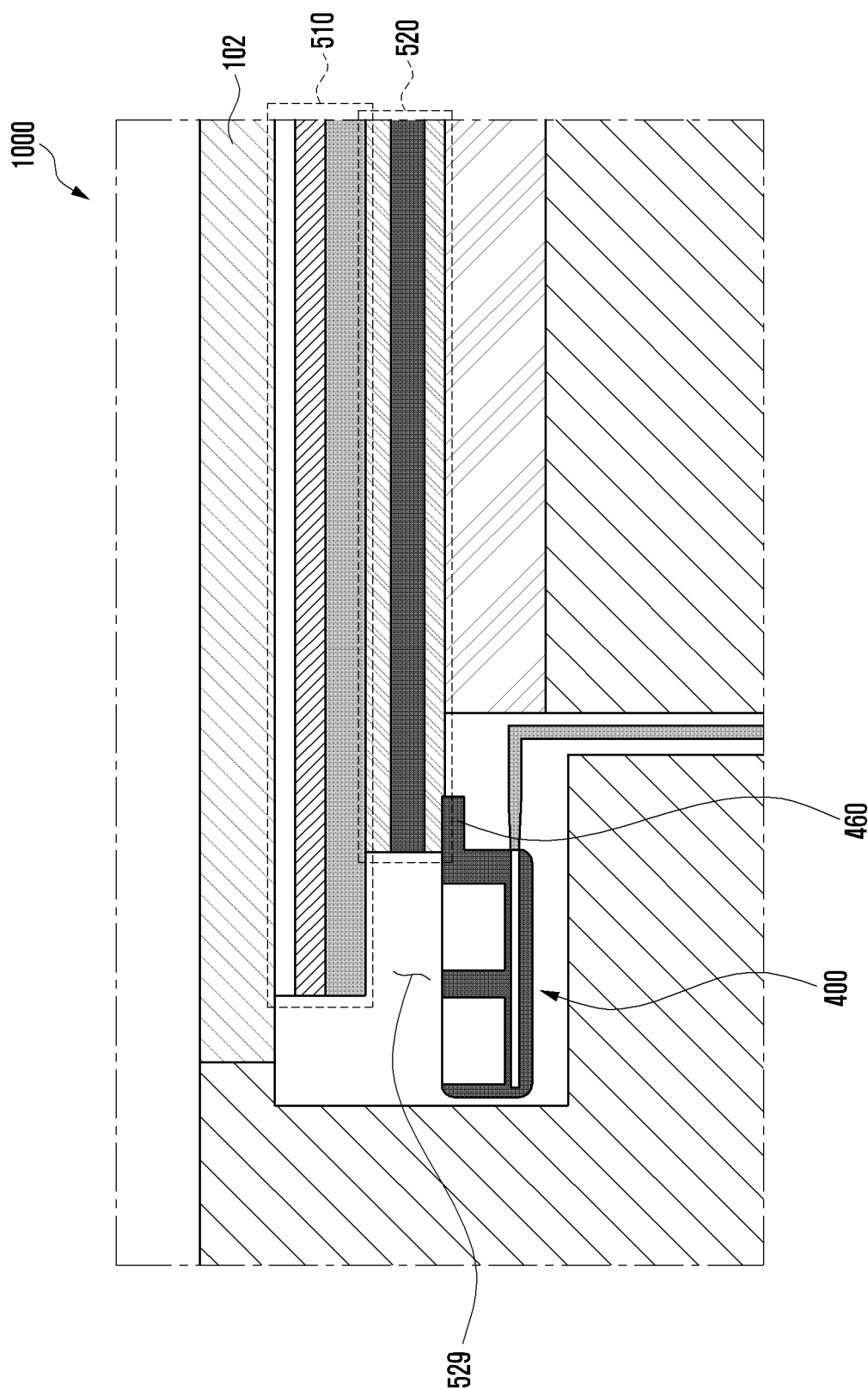

FIGS. 10 and 11 are diagrams illustrating a portion in which a sensor of an electronic device is disposed according to various embodiments of the disclosure. FIG. 10 is a diagram illustrating a shape of a flange according to an embodiment of the disclosure, and FIG. 11 is a cross-sectional view taken along line D-D' of FIG. 10.

Referring to FIGS. 10 and 11, the cover panel 520 of an electronic device 1000 (e.g., the electronic device 100 of FIG. 1) according to an embodiment of the disclosure may include an opening 529 connected to the hole and corresponding to the first area 521 (see FIG. 6B).

As described above, it may be advantageous for an accurate operation of the sensor 400 that the light receiving portion 420 of the sensor 400 according to various embodiments of the disclosure blocks light other than light that passes through the front plate 102 and the display panel 510. For example, by forming the opening 529 in the cover panel 520 and disposing a flange 460 that may be coupled to the cover panel 520 while entirely enclosing the light receiving portion 420 of the sensor 400, entrance of noise signals that may enter into the light receiving portion 420 may be effectively blocked.

According to an embodiment of the disclosure, the electronic device 500 may include a housing including a front plate facing in a first direction, a rear plate facing in a second direction opposite to the first direction, and a side member enclosing a space between the front plate and the rear plate; the display panel 510 having one surface viewed through the front plate; the cover panel 520 coupled to another surface of the display panel 510 and positioned in an inner area of the display panel 510 and having a hole formed adjacent to the first edge 515 of the display panel 510; and the sensor 400 in which the light receiving portion 420 is positioned to correspond to a position of a hole of the cover panel 520 and in which the light emitting portion 430 is positioned in an outer area of the display panel 510.

The cover panel 520 may include the first area 521 corresponding to a portion extended from the hole to the first edge 515 and the second area 523, which is the remaining portions, except for the hole and the first area 521.

The second area 523 of the cover panel 520 may include the embossed layer 525 having one surface coupled to the other surface of the display panel 510, the light shielding layer 526 having one surface coupled to another surface of the embossed layer 525 and for blocking transmission of light, the cushion layer 527 having one surface coupled to another surface of the light shielding layer 526, and the electromagnetic shielding layer 528 having one surface coupled to another surface of the cushion layer 527 and for blocking electromagnetic signal interference; and the first area 521 of the cover panel 520 may include the embossed layer 525 having one surface coupled to the other surface of the display panel 510, the light shielding layer 526 having one surface coupled to the other surface of the embossed layer 525 and for blocking transmission of light, and the cushion layer 527 having one surface coupled to the other surface of the light shielding layer 526.

The second area 523 of the cover panel 520 may include the embossed layer 525 having one surface coupled to the other surface of the display panel 510, the light shielding layer 526 having one surface coupled to the other surface of the embossed layer 525 and for blocking transmission of light, the cushion layer 527 having one surface coupled to the other surface of the light shielding layer 526, and the electromagnetic shielding layer 528 having one surface coupled to the other surface of the cushion layer 527 and for blocking electromagnetic signal interference; and the first area 521 of the cover panel 520 may include the embossed layer 525 having one surface coupled to the other surface of the display panel 510, the cushion layer 527 having one surface coupled to the other surface of the embossed layer 525, and the light shielding layer 526 having one surface coupled to the other surface of the cushion layer 527 and for blocking transmission of light.

The second area 523 of the cover panel 520 may include the embossed layer 525 having one surface coupled to the other surface of the display panel 510, the light shielding layer 526 having one surface coupled to the other surface of the embossed layer 525 and for blocking transmission of light, the cushion layer 527 having one surface coupled to the other surface of the light shielding layer 526, and the electromagnetic shielding layer 528 having one surface coupled to the other surface of the cushion layer 527 and for blocking electromagnetic signal interference; and the first area 521 of the cover panel 520 may include the light shielding layer 526 having one surface coupled to the other surface of the display panel 510 and for blocking transmission of light.

The sensor 400 may include the circuit board 410, the light receiving portion 420 mounted in the circuit board 410, the light emitting portion 430 spaced apart from the light receiving portion 420 to be mounted in the circuit board 410, and the first partition wall 440 disposed between the light receiving portion 420 and the light emitting portion 430.

The sensor 400 may further include the second partition wall 450 protruded from the first area 521 and the second area 523 with a hole of the cover panel 520 interposed therebetween.

The cover panel 520 may include the opening 529 connected to the hole and corresponding to the first area 521 and the flange 460 attached to at least a portion of the second area 523 of the cover panel 520 to cover the light receiving portion 420 of the sensor 400.

A display assembly according to an embodiment of the disclosure may include a front plate, the display panel 510 having one surface viewed through the front plate, and the cover panel 520 coupled to another surface of the display panel 510 and having a hole formed adjacent to the first edge 515 of the display panel 510, and the other surface of the display panel 510 and the light receiving portion 420 of the sensor 400 may directly face through the hole.

The cover panel 520 may include the first area 521 corresponding to a portion extended from the hole to the first edge 515 and the second area 523, which is the remaining portions, except for the hole and the first area 521.

The second area 523 of the cover panel 520 may include the embossed layer 525 having one surface coupled to the other surface of the display panel 510, the light shielding layer 526 having one surface coupled to another surface of the embossed layer 525 and for blocking transmission of light, the cushion layer 527 having one surface coupled to another surface of the light shielding layer 526, and the electromagnetic shielding layer 528 having one surface coupled to another surface of the cushion layer 527 and for blocking electromagnetic signal interference; and the first area 521 of the cover panel 520 may include the embossed layer 525 having one surface coupled to the other surface of the display panel 510, the light shielding layer 526 having one surface coupled to the other surface of the embossed layer 525 and for blocking transmission of light, and the cushion layer 527 having one surface coupled to the other surface of the light shielding layer 526.

The second area 523 of the cover panel 520 may include the embossed layer 525 having one surface coupled to the other surface of the display panel 510, the light shielding layer 526 having one surface coupled to the other surface of the embossed layer 525 and for blocking transmission of light, the cushion layer 527 having one surface coupled to the other surface of the light shielding layer 526, and the electromagnetic shielding layer 528 having one surface coupled to the other surface of the cushion layer 527 and for blocking electromagnetic signal interference; and the first area 521 of the cover panel 520 may include the embossed layer 525 having one surface coupled to the other surface of the display panel 510, the cushion layer 527 having one surface coupled to the other surface of the embossed layer 525, and the light shielding layer 526 having one surface coupled to the other surface of the cushion layer 527 and for blocking transmission of light.

The second area 523 of the cover panel 520 may include the embossed layer 525 having one surface coupled to the other surface of the display panel 510, the light shielding layer 526 having one surface coupled to the other surface of the embossed layer 525 and for blocking transmission of light, the cushion layer 527 having one surface coupled to the other surface of the light shielding layer 526, and the electromagnetic shielding layer 528 having one surface coupled to the other surface of the cushion layer 527 and for blocking electromagnetic signal interference; and the first area 521 of the cover panel 520 may include the light shielding layer 526 having one surface coupled to the other surface of the display panel 510 and for blocking transmission of light.

The sensor 400 may include the circuit board 410, the light receiving portion 420 mounted in the circuit board 410, the light emitting portion 430 spaced apart from the light receiving portion 420 to be mounted in the circuit board 410, and the first partition wall 440 disposed between the light receiving portion 420 and the light emitting portion 430.

The sensor 400 may further include the second partition wall 450 protruded from the first area 521 and the second area 523 with a hole of the cover panel 520 interposed therebetween.

The cover panel 520 may include the opening 529 connected to the hole and corresponding to the first area 521 and the flange 460 attached to at least a portion of the second area 523 of the cover panel 520 to cover the light receiving portion 420 of the sensor 400.

By disposing a portion of a sensor including a light receiving portion and a light emitting portion at a rear surface of a display panel, a space other than the display panel at a front plate can be reduced.

By changing a configuration of a cover panel, a light receiving performance of the sensor including the light receiving portion and the light emitting portion can be improved, and signal interference between the light receiving portion and the light emitting portion can be minimized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
a housing comprising:
  a front plate facing a first direction, and
  a rear plate facing a second direction opposite to the first direction;
a display panel having a first surface viewed through the front plate;
a cover panel coupled to a second surface of the display panel and positioned at an area that overlaps with the display panel, the cover panel comprising:
  a first area corresponding to a portion of the cover panel,
  a hole formed adjacent to a first edge of the display panel and separated from the first edge of the display panel by the first area, a second area including remaining areas of the cover panel except for the hole and the first area, and an electromagnetic shielding layer disposed only in the second area; and a sensor comprising:

a light receiving portion positioned to correspond to a position of the hole of the cover panel, and a light emitting portion positioned outside the first edge of the display panel when viewed from above the front plate, wherein the first area of the cover panel comprises:

a first embossed layer having a first surface coupled to the second surface of the display panel, receiving an uneven shape formed at the second surface of the display panel, and configured to absorb an impact, a first light shielding layer having a first surface coupled to a second surface of the first embossed layer, the first light shielding layer being configured to block transmission of light, and a first cushion layer having one surface coupled to a second surface of the first light shielding layer, and wherein the second area of the cover panel comprises:

a second embossed layer having a first surface coupled to the second surface of the display panel, receiving the uneven shape formed at the second surface of the display panel, and configured to absorb an impact, a second light shielding layer having a first surface coupled to a second surface of the second embossed layer, the second light shielding layer being configured to block transmission of light, a second cushion layer having a first surface coupled to a second surface of the second light shielding layer, and the electromagnetic shielding layer having one surface coupled to a second surface of the second cushion layer, the electromagnetic shielding layer being configured to block electromagnetic signal interference.

2. The electronic device of claim 1, wherein the sensor further comprises:

a circuit board;

a light receiving portion mounted on the circuit board;

a light emitting portion spaced apart from the light receiving portion and mounted on the circuit board; and a first partition wall disposed between the light receiving portion and the light emitting portion.

3. The electronic device of claim 2, further comprising a second partition wall protruded from the first area and the second area with the hole of the cover panel interposed therebetween.

4. The electronic device of claim 1, wherein the cover panel further comprises:

an opening connected to the hole and corresponding to the first area; and a flange attached to at least a portion of the second area of the cover panel, the flange being arranged to cover the light receiving portion of the sensor.

5. The electronic device of claim 1, wherein the light emitting portion is disposed in an area that does not overlap with the display panel, and wherein the light receiving portion is disposed at a rear surface of the display panel and overlaps with the display panel.

6. The electronic device of claim 1, wherein the hole of the cover panel is formed by either drilling the hole in the cover panel or redisposing the cover panel in the first area after the hole and the first area are collectively removed.

7. The electronic device of claim 4, wherein the flange is coupled to the cover panel while entirely enclosing the light receiving portion of the sensor.

8. An electronic device comprising:

a housing comprising:

a front plate facing a first direction, and a rear plate facing a second direction opposite to the first direction;

a display panel having a first surface viewed through the front plate;

a cover panel coupled to a second surface of the display panel and positioned at an area that overlaps with the display panel, the cover panel comprising:

a first area corresponding to a portion of the cover panel, a hole formed adjacent to a first edge of the display panel and separated from the first edge of the display panel by the first area, a second area including remaining areas of the cover panel except for the hole and the first area, and an electromagnetic shielding layer disposed only in the second area; and a sensor comprising:

a light receiving portion positioned to correspond to a position of the hole of the cover panel, and a light emitting portion positioned outside the first edge of the display panel when viewed from above the front plate, wherein the first area of the cover panel comprises:

a first embossed layer having a first surface coupled to the second surface of the display panel, receiving an uneven shape formed at the second surface of the display panel, and configured to absorb an impact, a first cushion layer having a first surface coupled to a second surface of the first embossed layer, and a first light shielding layer having one surface coupled to a second surface of the first cushion layer, the first light shielding layer being configured to block transmission of light, and wherein the second area of the cover panel comprises:

a second embossed layer having a first surface coupled to the second surface of the display panel, receiving the uneven shape formed at the second surface of the display panel, and configured to absorb an impact, a second light shielding layer having a first surface coupled to a second surface of the second embossed layer, the second light shielding layer being configured to block transmission of light, a second cushion layer having a first surface coupled to a second surface of the second light shielding layer, and the electromagnetic shielding layer having one surface coupled to a second surface of the second cushion layer, the electromagnetic shielding layer being configured to block electromagnetic signal interference.

9. An electronic device comprising:

a housing comprising:

a front plate facing a first direction, and a rear plate facing a second direction opposite to the first direction;

a display panel having a first surface viewed through the front plate;

a cover panel coupled to a second surface of the display panel and positioned at an area that overlaps with the display panel, the cover panel comprising:

a first area corresponding to a portion of the cover panel, a hole formed adjacent to a first edge of the display panel and separated from the first edge of the display panel by the first area,
a second area including remaining areas of the cover panel except for the hole and the first area, and
an electromagnetic shielding layer disposed only in the second area; and
a sensor comprising:
a light receiving portion positioned to correspond to a position of the hole of the cover panel, and
a light emitting portion positioned outside the first edge of the display panel when viewed from above the front plate,
wherein the first area of the cover panel comprises a first light shielding layer having one surface coupled to the second surface of the display panel, the first light shielding layer being configured to block transmission of light, and
wherein the second area of the cover panel comprises:
an embossed layer having a first surface coupled to the second surface of the display panel, receiving an uneven shape formed at the second surface of the display panel, and configured to absorb an impact,
a second light shielding layer having a first surface coupled to a second surface of the embossed layer, the second light shielding layer being configured to block transmission of light,
a cushion layer having a first surface coupled to a second surface of the second light shielding layer, and
the electromagnetic shielding layer having one surface coupled to a second surface of the cushion layer, the electromagnetic shielding layer being configured to block electromagnetic signal interference.

10. A display assembly comprising:
a front plate;
a sensor comprising a light receiving portion and a light emitting portion;
a display panel comprising a first surface viewed through the front plate; and
a cover panel coupled to a second surface of the display panel and positioned at an area that overlaps with the display panel, the cover panel comprising:
a first area corresponding to a portion of the cover panel,
a hole formed adjacent to a first edge of the display panel and separated from the first edge of the display panel by the first area,
a second area including remaining areas of the cover panel except for the hole and the first area, and
an electromagnetic shielding layer disposed only in the second area,
wherein the second surface of the display panel and the light receiving portion of the sensor directly face each other through the hole,
wherein the light emitting portion is positioned outside the first edge of the display panel when viewed from above the front plate,
wherein the first area of the cover panel comprises:
a first embossed layer having a first surface coupled to the second surface of the display panel, receiving an uneven shape formed at the second surface of the display panel, and configured to absorb an impact,
a first light shielding layer having a first surface coupled to a second surface of the first embossed layer, the first light shielding layer being configured to block transmission of light, and
a first cushion layer having one surface coupled to a second surface of the first light shielding layer, and
wherein the second area of the cover panel comprises:
a second embossed layer having a first surface coupled to the second surface of the display panel, receiving the uneven shape formed at the second surface of the display panel, and configured to absorb an impact,
a second light shielding layer having a first surface coupled to a second surface of the second embossed layer, the second light shielding layer being configured to block transmission of light,
a second cushion layer having a first surface coupled to a second surface of the second light shielding layer, and
the electromagnetic shielding layer having one surface coupled to a second surface of the second cushion layer, the electromagnetic shielding layer being configured to block electromagnetic signal interference.

11. The display assembly of claim 10, wherein the sensor further comprises:
a circuit board, the light receiving portion being mounted on the circuit board;
a light emitting portion spaced apart from the light receiving portion, and mounted on the circuit board; and
a first partition wall disposed between the light receiving portion and the light emitting portion.

12. The display assembly of claim 11, further comprising a second partition wall protruded from the first area and the second area with the hole of the cover panel interposed therebetween.

13. The display assembly of claim 10, wherein the cover panel further comprises:
an opening connected to the hole and corresponding to the first area; and
a flange attached to at least a portion of the second area of the cover panel, the flange being arranged to cover the light receiving portion of the sensor.

14. A display assembly comprising:
a front plate;
a sensor comprising a light receiving portion and a light emitting portion;
a display panel comprising a first surface viewed through the front plate; and
a cover panel coupled to a second surface of the display panel and positioned at an area that overlaps with the display panel, the cover panel comprising:
a first area corresponding to a portion of the cover panel,
a hole formed adjacent to a first edge of the display panel and separated from the first edge of the display panel by the first area,
a second area including remaining areas of the cover panel except for the hole and the first area, and
an electromagnetic shielding layer disposed only in the second area,
wherein the second surface of the display panel and the light receiving portion of the sensor directly face each other through the hole,
wherein the light emitting portion is positioned outside the first edge of the display panel when viewed from above the front plate,
wherein the first area of the cover panel comprises:
a first embossed layer having a first surface coupled to the second surface of the display panel, receiving an uneven shape formed at the second surface of the display panel, and configured to absorb an impact, a first cushion layer having a first surface coupled to a second surface of the first embossed layer, and a first light shielding layer having one surface coupled to a second surface of the first cushion layer, the first light shielding layer being configured to block transmission of light, and wherein the second area of the cover panel comprises:

a second embossed layer having a first surface coupled to the second surface of the display panel, receiving the uneven shape formed at the second surface of the display panel, and configured to absorb an impact, a second light shielding layer having a first surface coupled to a second surface of the second embossed layer, the second light shielding layer being configured to block transmission of light, a second cushion layer having a first surface coupled to a second surface of the second light shielding layer, and the electromagnetic shielding layer having one surface coupled to a second surface of the second cushion layer, the electromagnetic shielding layer being configured to block electromagnetic signal interference.

15. A display assembly comprising:
a front plate;
a sensor comprising a light receiving portion and a light emitting portion;
a display panel comprising a first surface viewed through the front plate; and
a cover panel coupled to a second surface of the display panel and positioned at an area that overlaps with the display panel, the cover panel comprising:
a first area corresponding to a portion of the cover panel,
a hole formed adjacent to a first edge of the display panel and separated from the first edge of the display panel by the first area,
a second area including remaining areas of the cover panel except for the hole and the first area, and
an electromagnetic shielding layer disposed only in the second area,
wherein the second surface of the display panel and the light receiving portion of the sensor directly face each other through the hole,
wherein the light emitting portion is positioned outside the first edge of the display panel when viewed from above the front plate,
wherein the first area of the cover panel comprises a first light shielding layer having one surface coupled to the second surface of the display panel, the first light shielding layer being configured to block transmission of light, and
wherein the second area of the cover panel comprises:
an embossed layer having a first surface coupled to the second surface of the display panel, receiving an uneven shape formed at the second surface of the display panel, and configured to absorb an impact,
a second light shielding layer having a first surface coupled to a second surface of the embossed layer, the second light shielding layer being configured to block transmission of light,
a cushion layer having a first surface coupled to a second surface of the second light shielding layer, and
the electromagnetic shielding layer having one surface coupled to a second surface of the cushion layer, the electromagnetic shielding layer being configured to block electromagnetic signal interference.

* * * * *